United States Patent [19]

Graefe

[11] 4,311,510

[45] Jan. 19, 1982

[54] METHOD FOR PRODUCING HIGH-GRADE FERTILIZER

[76] Inventor: Gernot Graefe, Bergstrasse 6, A 7082 Donnerskirchen, Austria

[21] Appl. No.: 201,540

[22] Filed: Oct. 28, 1980

Related U.S. Application Data

[63] Continuation-in-part of Ser. No. 111,988, Jan. 14, 1980, which is a continuation-in-part of Ser. No. 812,856, Jul. 5, 1977, Pat. No. 4,211,545.

[30] Foreign Application Priority Data

Jul. 7, 1976 [AT] Austria .................................. 4977/76
May 18, 1977 [AT] Austria .................................. 3581/77
Mar. 27, 1979 [AT] Austria .................................. 2287/79
Jun. 19, 1979 [AT] Austria .................................. 4330/79

[51] Int. Cl.³ ............................................. C05F 11/08
[52] U.S. Cl. ......................................... 71/9; 435/42; 435/253; 426/15; 426/49
[58] Field of Search ............................. 71/5, 6, 8-10, 71/23, 25, 26; 426/15, 49, 53, 54; 435/42, 136, 140, 157, 165, 170, 171, 253, 254

[56] References Cited

U.S. PATENT DOCUMENTS 3,793,153  2/1974  Miura ..................................... 435/42
4,094,742  6/1978  Bellamy ................................. 435/42
4,237,233  12/1980 Yoshikumi et al. .................. 435/254

*Primary Examiner*—S. Leon Bashore
*Assistant Examiner*—Ferris H. Lander
*Attorney, Agent, or Firm*—Toren, McGeady & Stanger

[57] ABSTRACT

A method for producing a fertilizer and decay promoting substance by subjecting grape marc to aerobic decay so that in a first phase, the sugar content is converted to alcohol and microbial fermentation produces organic acids. During the first phase, the alcohol and acids react to produce aromatic esters and a decay stabilized mass. In a second phase, the mass is rearranged to facilitate access of air and promote penetration of the mycelia of *Humicola lanuginusa* and thermophilic actinomycetes into the mass. In a third step, the mass is rearranged to effect microbial degradation of the mycelia and the mass is dried and the pip-containing fraction is separated. The thus obtained pips or seeds are infested with spores of the above-mentioned microorganisms and still contain their natural oil content and constitute an excellent high-grade fertilizer and aerobic decay promoting agent for the decay of vegetable and animal waste materials.

10 Claims, No Drawings

METHOD FOR PRODUCING HIGH-GRADE FERTILIZER

CROSS-REFERENCE TO RELATED APPLICATIONS

This application is a continuation-in-part of copending application Ser. No. 111,988, filed Jan. 14, 1980, the contents of which are incorporated herein by reference, which application is, in turn, a continuation-in-part of application Ser. No. 812,856, filed July 5, 1977, now U.S. Pat. No. 4,211,545, July 8, 1980 the contents of which are also incorporated herein by reference and is based on disclosure document No. 078047, filed Feb. 13, 1979, the contents of which are also incorporated herein by reference.

BACKGROUND OF THE INVENTION

1. Field of the Invention

This invention relates to the utilization of the degradation of organic matter to produce usable heat energy and fertilizer.

2. Description of the Prior Art

It is estimated that the amount of energy released annually on earth from biomass is thirty times the amount released by all man-made machines. The biological flow of energy, however, generally proceeds unobtrusively. Organic material, finely divided in the humus layer of the soil or in water, is decomposed by organisms with the evolution of heat back into the starting materials.

The decaying processes which take place, for example, over a large area in the scattered layer of the forest floor, can, however, be concentrated. It is for this reason that every gardener is advised to collect plant waste in stacked heaps having a volume of approximately two cubic meters in order to achieve, by such concentration, a high degree of heat and a vigorous rotting, resulting from the combined effects of the many material and energy conversions taking place. Some organic materials, such as, straw or wood waste, must be heaped in even larger amounts and require nitrogen-containing materials to be mixed in in order to initiate a vigorous, hot rotting.

Most natural processes proceed more rapidly at higher temperature levels than at lower ones. This is also true for humification. The heat which develops in the center of the compost heap indicates a vigorous metabolic selectivity of thermophilic micro-organisms. Along with the degradation and conversion of the organic substances, the high temperature also has certain positive aspects. Thus, it becomes too hot for the development of fruit flies and other unwelcome diptera. Various stages of parasites, plant pathogens and pathogenic micro-organisms are put at a disadvantage in the hot rotting material and are killed as are the seeds of weeds, if the heating is sufficiently strong and penetrates the mass.

SUMMARY OF THE INVENTION

I have discovered a method for preparing a substance which can initiate, promote, and sustain the decay of organic materials at higher temperatures. Additionally, the substance prepared by the present process can be used to prepare very high grade fertilizer.

More particularly, the substance of the present invention comprises grape pips obtained by the aerobic decay process of the present invention and which are thereby infested with humicola and also still contain their natural oil content. This substance is prepared by:

(a) subjecting a mass of grape marc to aerobic decay wherein
 1. the sugar content of the marc is converted to alcohol which reacts with organic acids produced from microbial fermentation and the acids and alcohols react to produce esters;
 2. rearranging the decaying marc to facilitate access of air thereto to promote penetration of the mycelia of *Humicola lanuginosa* and thermophilic actinomycetes into the mass;
 3. rearranging the mass into a loose form to effect microbial degradation of the mycelia; and
(b) drying the mass and separating a pip-containing fraction.

The pips are normally opened up, as by crushing, before use and are particularly suitable for use as a high grade fertilizer or as an aerobic decay promoting agent to promote the decay of vegetable and animal waste materials.

Alternately, the dried mass may be, as a whole, subjected to a crushing or comminuting operation as in a silo cutter so that the crushed pips remain within the mass. The mass, with the crushed pips therein, can then be allowed to decay in the same manner as the separated pip-containing fraction as disclosed hereinafter, although the decay and overall heat production take place somewhat more slowly and uniformly than when only the pips are used. This embodiment can thus be used when a slower heating process is desired.

DESCRIPTION OF THE PREFERRED EMBODIMENT

Preferably, the growth of *Humicola lanuginosa* and thermophilic actinomycetes is promoted during stage (2) after the esterification step. The decay promoting substance of the present invention may be employed by arranging the crushed pips in concentrated form within or below the center of a pile of vegetable waste as an initiation point for the decaying process. Optionally, a portion of the crushed pips may be distributed in the bulk of the vegetable waste. This type of application is suitable for the decay of waste materials which contain straw, bark, gardening waste, spent mushroom compost, wood chips, or the like. The application of the decay promoting substance of the present invention for the hot decay of human or animal feces as well as of weeds is particularly valuable. The material can also be for the odor-free decay of waste with a high protein content, for example, mushroom waste, animal cadavers, and the like.

If fertilizer is to be produced from the material itself, urea, organic phosphorus and/or nitrogen compounds, animal fertilizer and/or minerals, trace elements, plant ash or vegetable waste, for example, chopped up grape vines, may be added to the crushed pips before or during the decaying process. Since the fertilizer in some cases possesses an extremely high effectiveness, it is advisable to leach the crushed pips at the conclusion of the decaying process. The leached, crushed pips can then be used as a substrate for humus closets. The leaching solution can then be used as a high-grade liquid fertilizer.

The production of the grape pips commences with the storage of fresh grape marc between wooden walls, which are lined on the inside with expanded aluminum.

There should be narrow aeration gaps between the wooden posts or boards which form the outer wall. The mats of expanded metal at the interior sides are to be adjusted so that, in spite of uniform aeration, a maximum of moisture is condensed by the inclined metal surfaces of the expanded aluminum and returned to the warm marc material.

The temperature increases slowly in the mass of the fresh press residues and the yeasts multiply and ferment the sugar content of the grape marc to produce alcohol and carbon dioxide. At the same time, anaerobic, living strains of micro-organisms carry out fermentation processes which produce organic acids. During this phase, especially smaller masses of marc tend to remain at a temperature level of 45° C. The special wall of wood and expanded aluminum metal now comes into play in that it provides, on the one hand, a certain degree of insulation and, on the other, moderate aeration through the expanded metal mats. Under these conditions, the aerobic, acid-tolerating and thermophilic species *Humicola lanuginosa* followed by thermophilic strains of actinomycetes develops and grows with its whitish gray mycelia from the outside into the substrate. In so doing, it assists considerably in driving the temperature above 50° C. in all regions of the mass. The acidic reaction taking place maintains the pH at about 4 to 5 which corresponds to the requirements of the organisms.

As soon as the range of 50° C. has been exceeded, the alcohol and the organic acids thus produced begin to react rapidly with one another. Esters are formed which endow the material with a strong brown color and a specific, aromatic odor. In this stage, the organic acids, which previously had an annoying odor, are chemically bound by the esterification. The temperatures in this phase are far above 33° C., so that a mass increase in pomace flies is prevented.

The first step of the process is concluded with the systematic esterification. The result is a material which can be stored relatively well and which has a high energy content of about 20,000 kjoules/kg due solely to the stable ester component.

In phase 2 of the process, which may follow directly or after an intermediate storage period, this material is used as an energy carrier in that the mycelia of the aforementioned *Humicola lanuginosa* and the thermophilic strains of actinomycetes are permitted to grow completely through and permeate the mass.

Heat exchangers, which give off heat to the outside through a current of air or a circulating flow of water, may be mounted in the center of the mass of esterified marc material. A vessel may also be arranged in the center and connected with the waterline. By so doing, the water is heated up to a temperature of about 64° C.

A cubic meter of marc, which is completely permeated by *Humicola lanuginosa* and the actinomycetes species, gives off heat for about one month. As an approximate rule, it may be assumed that two cubic meters remain hot for two months and five cubic meters for about five months without the decaying process coming to a premature halt as a result of the constant dissipation of heat.

Accordingly, a small room or a stall may be heated for the entire winter without having to expend any additional work energy during the period. The preparation of hot water can also be carried out for long periods of time and, in practice, up to the next grape harvest if, after proper storage, new packages of esterified material can be placed around the water container. It is, however, most convenient to utilize the heat soon after the harvest when the cold period of the year commences. At that time, the microbial release of the energy of the sun, which has been chemically bound during the warm vegetation period, is particularly desirable.

If the marc is mixed, i.e., rearranged, at the end of phase 2, temperatures of 68° C. to 84° C. are attained after two to three days. This post-decay is not desirable for a long-lasting, uniform utilization of heat, but is particularly important for the humification of the pulp and skin residues, at the end of which, the marc takes on a dark color. Spores of different thermophilic microorganisms remain on the surface of the pips in the dormant state until they become functional again in a further decaying process.

The material is now dried. At the same time, the residual heat of the post-decaying process and the waste heat of any continuing main decaying process of phase 2 can be utilized.

The grape pips can be separated from the already decayed marc components by a sieving process. In so doing, about 40% of the volume is composed of material which can be immediately used as an organic fertilizer. The grape pips make up about 60% of the volume and constitute an energy carrier which can be kept for a long period.

Before the pips are used in accordance with the present invention, they are opened, for example, by crushing. The pips are seeds, at whose outer walls exist, depending on the prior treatment, thermophilic microorganisms in the dormant state, while the inner wall surrounds the embryo and the blastodermic layers. The latter are killed by the heat and are in the initial stages of a slow degradation. The slow degradation processes are brought to a halt by drying. The content of the pips is very rich in energy because of the presence of grape-pip oil, and about 25,000 kjoule/kg can be expected.

In addition, the pips contain all of the nutrients necessary for the development of a seedling and therefore, also the substances for microbial growth. When the individual components of the grape pips are exposed during crushing to the oxygen of the air and a moisture of more than 23%, vigorous decay processes commence immediately. The crushed pips can be moistened with cold or warm water. The moist, crushed pips can now be used at the desired location.

By opening the pips, the microbe spores at the surface come together with the oil and food reserves in the interior of the seed residues. Within the course of a few hours, a decaying process sets in which, just like phase 2, permits a systematic withdrawal of heat, for example, for controlling the temperature of a room, or heating water. This decay process is especially suitable for controlling the temperature and humidity of and supplying carbon dioxide to plants cultivated under glass or plastic film. The crushed pips in the receptacles of expanded metal give off heat and supply the atmosphere of the glasshouse with carbon dioxide, so that any ventilation for supplying carbon dioxide, which would be associated with heat losses, becomes superfluous.

Crushed pips may be embedded in materials which, on their own accord, cannot cross the energy threshold to a vigorous, hot decaying process, in order to draw these materials into the thermophilic range or to accelerate their decay. It is also possible to incorporate nests of crushed pips in these materials for which a space of 0.02 m$^3$ is sufficient and in which high temperatures rapidly build up. The crushed pips may be mixed uniformly or preferably, a layer of crushed pips is formed in the lower region which then heats the substrate above.

As noted hereinabove, if desired, rather than separating the pips, the dried mass with the pips therein can be subjected to comminution as by means of a silo cutter. Thus, during the transport within the silo cutter, the material is passed through a blower which rotates at high speed and is provided with narrow, flatly inclined fan blades to pick up and crush all of the pips. This entire material may be used in the manner disclosed herein as fertilizer or decay promoting material, the only difference being that the rate of decay and heat production will be somewhat slower and more uniform than when only the crushed pips are used without the additional mass.

The most important interaction that takes place consists of the exchange of heat. The next most important interaction may be the output of spores of thermophilic micro-organisms which develop in the vicinity of the pips and are carried upwards by the moist current of air. The decaying material may also, however, be surrounded on all sides by crushed pips. This latter procedure is recommended in the case of protein-rich substances, waste meat, mushrooms or unpleasantly smelling feces. Waste meat and animal cadavers may, for example, be placed in a plastic bag on a dry support and covered with crushed pips. Crushed pips are, however, also suitable as a filter layer for urine and as an odor-binding base for areas in which highly malodorous animal feces and urine are concentrated. The use of crushed pips effectively prevents annoying odors from developing.

As the result of the giving off of heat and spores, the crushed pips frequently are in a position to force the surrounding substances to decay so rapidly, that their effect can almost be described in terms of catalytic capabilities.

If the mixture is packed relatively tightly, a thermophilic fungus of the *humicola* type is likely to be the main form of organism. If the material is packed less tightly, actinomycetes have greater possibilities for development. Innumerable variations of such methods can be used. All of them can be employed for an effective recycling.

An example of such recycling is the annual pruning of vines which takes place in the early spring in vineyards. The vines contain significant amounts of nutrients and trace elements. However, they do not decay readily and are usually burned at the edge of the vineyards. The ash is then blown away aimlessly by the wind.

In accordance with the present invention, the ash from the burning of vines is covered with an approximately equal amount of moist crushed pips. The mass is then mixed and allowed to decay in a well ventilated receptacle. By so doing, a portion of the mineral components of the vine ash is bound organically and a portion is retained by the humin molecules. In addition, the mycelia of the micro-organisms form a connecting structure. The ash component is tied into the crushed pips and can no longer be blown away when it is returned to the vineyard. The vines may also be chopped up and added in this form to the freshly ground pips in order to be decayed.

Poultry manure has an unpleasant odor. When added to crushed pips (up to 40% of the weight of the pips) and allowed to decay, it loses its unpleasant properties and, at the same time, increases the phosphorus content of the decayed material, since the phosphorous content of the pips is about 0.7% of the dry material. At the same time, ectoparasites, worm eggs, *coccidia* spores, and the like, which may be harbored in the poultry manure, are killed.

During this active phase, widely differing components may react with each other and form special manure or produce special trace element enriched substrates. Admixtures with a high percentage of soil, loam, clay or ground basalt (about 10% based on the pips) provide significant temperatures and a substrate which is completely permeated by the mycelia of the thermophilic micro-organisms. The decaying process can be delayed by this addition and the diffusion of gas within the mass proceeds more uniformly because the maximum temperatures are also not as high. With ground basalt, plant nutrients are supplied which promote the formation of a clay-humus complex which influences the properties of agriculturally used soils in an advantageous manner. The addition of potash is required only infrequently because the crushed pips contain about 3% of potash in the dry state.

Smaller amounts of the substance, which become particularly hot as a result of the process can, because of their large surface area, lose their existing moisture content as well as the moisture formed during the aerobic decaying process. For this reason, wall elements which lead to the recycling of the moisture are important. The covering also plays a role.

The simplest and most appropriate solution is to cut a plastic covering film in such a manner that it is a little larger than the top opening of the receptacle. The covering is spread out on top of this and weighted down with a correspondingly smaller metal ring, so that a hat is formed in the center into which the moist, warm updraft from the hot decaying center rises and gives up condensed water at the cooler interior side of the film. The condensed water flows away laterally and, at that location in the plastic film which contacts the metal ring, a sort of dripstone forms in the film and the condensed water flows back into a region near the center of the material rather than in the direct region of the edge. The return of the moisture to the center region is important since this is where the more significant losses of moisture occur as a result of the chimney action in the spaces between the material in the somewhat lower lying areas.

The surface of the exposed heap is significantly cooler than the interior. The probability that all the weed seeds and undesirable spores from this area enter the hotter zone at least once, depends on the number of times that the heap is turned over.

However, it is possible to form a hot element from the crushed pips in a stationary silo which comes into contact with all parts of the mass at least once. For this purpose, wall elements of expanded metal mats are used which can be suspended next to one another by any convenient means. A double ring is formed by adding an additional wall element to the outer ring. The space between the two walls is filled with moist, crushed pips and, on the floor within the inner ring, a 5 to 10 cm high layer of the same crushed pips is deposited, from which a similar heating effect emanates as from the double wall which is filled with crushed pips.

Since the heat rises and moreover is liberated by the condensation of water vapor within the plastic film, all of the material is heated completely, if careful attention is paid to obtaining complete film coverage within the inner ring.

In the case of an arrangement with a double wall, depending on the specific case, larger quantities of crushed pips are normally required. For the average garden owner, the easily assembled ring suffices, depending on the amount of waste. The expanded metal must be adjusted correctly only for the recovery of water. The wall of the silo then acts as more than an air permeable wall serving mainly for confining the mass.

In order to make thermophilic decay available for smaller quantities of gardening waste, one need only provide a nest of moist crushed pips in the center, if possible somewhat below the middle of the mass. Thus, a special feature of the present invention is that no other organic material is known which allows such long-lasting thermophilic conditions to be created using such small quantities and which exerts such an intensive effect on the bonding of other organic and inorganic materials without being detrimental to the acceleration of the degradation, conversion and synthesis processes in the composting mass. The components of the equipment, on the other hand, are of subordinate importance.

Compared to corresponding processes in the normal compost heap, the present method has the advantage that a predetermined mixture can be obtained from different components, which are linked microbially to one another under controlled conditions even in the smallest region.

A further area of application for the invention is the raising of button mushrooms. The button mushroom prefers a low temperature. Commercially, this mushroom is therefore raised in cellars or in rooms having controlled air conditioning. When the button mushroom compost is removed after several harvests, the substrate is completely interlaced with fungal mycelia. These fungal mycelia are rather vigorous, even if they are frequently torn as the compost is turned and worked. In any case, however, the mycelia do not die rapidly, and especially not at the external temperatures during the winter or during transition periods between seasons.

A mushroom compost for horticulture or agricultural purposes should be well decayed. This is especially true for the mycelia themselves, in which a significant portion of the nitrogen present is chemically bound in the protein. The degradation of the mycelia can, however, be initiated rapidly by filling ventilated receptacles of at least 50 liter capacity with crushed pips and incorporating them in a central position at intervals in the heaps of spent mushroom compost. The crushed pips rapidly convert to a hot decay stage and, at the walls of the receptacle which acts as a heat exchanger, ensure that the adjacent spent compost rapidly reaches temperatures in excess of 30° C. Before the inoculation, the substrate itself has already undergone a hot decay, during which all of the easily degradable components of the compost have already been taken up by the thermophilic micro-organisms.

When the temperature is increased once again, it is the mushroom mycelia, with their preference temperatures of below 15° C., which are affected most sensitively. At the same time, the heat-emitting marc receptacle gives off spores of thermophilic actinomycetes through the openings to the adjacent substrate. These spores immediately commence to process the mycelial substance. In so doing, additional heat is produced which migrates outwards and, as it proceeds towards the periphery, causes the collapse of the heat-sensitive mycelia.

After this brief initial phase, which represents a significant saving of time for the maturing of the compost, the process may adjust itself to any convenient long-term temperature which, in any case, leads to more advantageous properties of the material.

According to investigations, metabolic products are eliminated by the mycelia of mushrooms, which have an inhibiting effect on the germination and growth of young plants. These inhibiting metabolic products disappear during the post-composting.

It is, however, a basic prerequisite for the rapid sequence of these events that the living mycelial tissue is killed quickly and as completely as possible by the thermophilic micro-organisms together with the high temperatures of the surroundings. If not carried out along thermophilic lines, the process takes several times as long. The degradation of the mycelia, which are embedded in the substrate, proceeds unobtrusively and slowly.

The situation is different with mushroom waste obtained during harvesting and to which, at most, small amounts of covering soil adhere. In this case, microbial degradation of protein sets in after some time and is accompanied by extremely unpleasant odors. In such a situation, it is recommended to scatter in crushed pips which are uniquely able to lead the surrounding substrate to a hot decay and, at the same time, ensure that the unpleasant decaying odors are contained. The aforementioned materials may be added before or during the decay of the crushed pips.

Accordingly, the germination ability of seed-carrying weeds can be eliminated completely by hot decay of the weeds together with crushed pips. Worm eggs and pathogenic spores in human feces can be reliably killed if the feces is hot decayed together with crushed pips. If the material has reached a temperature in excess of 60° C., it may also be used later for growing vegetables. This also applies to animal feces for which it is desired to kill parasites or their eggs.

When the crushed pips cool down, they are ready for use as a fertilizer. However, even in this stage of slight microbial activity, the crushed pips still possess significant odor-binding capabilities. This is particularly evident when feces are mixed with the crushed pips which immediately direct the degradation in a low-odor aerobic direction. For this purpose, it is necessary to weaken the high-grade fertilizer by leaching, since it has sufficient odor-bonding power even in this state and since the liquor can be used as a valuable, liquid fertilizer.

What is claimed is:
1. A method for producing a fertilizer and decay promoting material comprising:
(a) subjecting a mass of grape marc to aerobic decay wherein:
  1. the sugar content of the marc is converted to alcohol which reacts with organic acids produced from microbial fermentation and the acids and alcohols react to produce esters;
  2. rearranging the decaying marc to facilitate access of air thereto to promote penetration of the mycelia of *Humicola lanuginosa* and thermophilic actinomycetes into the mass,
  3. rearranging the mass into a loose form to effect microbial degradation of the mycelia;
(b) drying the mass.
2. The method of claim 1 wherein the thermophilic actinomycete is of the *streptosporangium* type.

3. The method of claim 1 wherein the mass is subjected to treatment to open up the pips contained in the mass.

4. The method of claim 3 wherein the mass is subjected to treatment to crush the pips therein.

5. The fertilizer and decay promoting material prepared by the process of claim 3.

6. The method of claim 1 wherein the temperature during step (a) 1 is above about 33° C.

7. The method of claim 1 wherein the temperature during step (a) 1 is about 45° C. to 50° C. and the pH is about 4 to 5.

8. The method of claim 1 wherein the temperature at the end of step (a) 2 is about 68° C. to 84° C.

9. A fertilizer and aerobic decay promoting material comprising a fertilizer or aerobic decay promoting effective amount of grape pips infested with humicola and containing their natural content of oil.

10. The fertilizer and decay promoting material prepared by the process of claim 1.

* * * * *